Patented Nov. 22, 1938

2,137,897

UNITED STATES PATENT OFFICE 2,137,897

MEAT PACKING METHOD

Harry H. McKee and Floyd Seaver, Chicago, Ill., assignors to Swift and Company, Chicago, Ill., a corporation of Illinois No Drawing. Application October 6, 1930, Serial No. 486,737

1 Claim. (Cl. 99—107)

This invention relates to the meat packing industry, and more especially to certain improved sliced meat products and to methods of producing and dispensing the same.

Heretofore it has generally been customary to chill the meats promptly after butchering and to so maintain them somewhat short of freezing ready for the market and for retail, and then after shipment to slice them eventually in the retail shops according to current needs; and recently exceptionally to treat the meats as set forth in the application of Harry H. McKee, Serial No. 368,941, filed June 6, 1929, the teaching of which is to chill the meat promptly upon dressing and then immediately to slice standard cuts thereof mechanically for reassemblage and shipping in sliced condition without appreciable change in external appearance, except as to wrapping or package form.

The main objects of the present invention are to improve upon the industrial meat treating methods heretofore in use and more especially to provide a better combination and sequence of steps; to provide a better method of thermically treating the meat incident to packing and distribution; and to provide an improved and better form of sharp frozen meat packages, adapted to meet the needs of the retailer and especially to win the favor and approval of the consumer and provide for more readily dispensing retail packages of sharp-frozen sliced meats in such form as to be adapted for immediate use or for convenient storage in the usual domestic mechanical refrigerators.

In the practice of the present invention the freshly butchered carcass or carcass part, either with or without bone, is immediately submitted to the freezing action of a rapid current of very cold atmosphere whereby the meat is quickly frozen to a greater or less depth according to preference and specific needs, and whereby the meat is rendered most fit for mechanical slicing. The quick freezing assures against disrupting the tissues by coarse crystallization, for the crystals will all be extremely small and fine. The meat quickly becomes sharp-frozen and very hard. If desired, the draft freezing step may be shortened and the meat permitted to remain in a quiescent atmosphere sufficiently for "tempering" or equalization of temperature prior to slicing. This is usually preferable because of the increased capacity of the apparatus that results therefrom.

The meat is then submitted, at proper temperature which is preferably between zero degrees F. and 32 degrees F., to the action of an appropriate slicing machine, as for instance, a blade slicer, or a sawing machine. Bone-in meats are thus treated equally with boneless meats. The slices are then reassembled and bound together in package form, whereupon the meat is preferably again submitted to a very low temperature either with or without the rapid draft feature, whereby the meat quickly becomes intensely congealed or "sharp-frozen" throughout its mass. The package may comprise a mere binder to hold the slices or if preferred a complete wrapping of any desired kind. Quick freezing by a cold draft is always preferable to slow freezing, especially until the whole mass is substantially frozen and the moisture has been converted into the form of small crystals. Thereafter, slow freezing may be continued to the "sharp" stage (about zero F. or lower).

The sharp freezing of the package, to zero degrees F. or lower, better assures safe handling and freedom from softening at the surface, and prevents deterioration such as sometimes results if moderately frozen meat is subjected even temporarily to a thawing temperature such as is incident to distant shipment or to handling in the retail shop.

After the meat reaches the retailer it is kept preferably at or near zero until after the time it is to be dispensed to the consumer, when it is exposed to a less frigid temperature of about 15° to 20° F. This is the temperature of the usual and most efficient showcases. This manner of handling results in the delivery to the consumer of a frozen product. But if desired the frozen meat may be defrosted in the retail shop by exposure to a temperature above 32° F., whereby it may be caused to thaw sufficiently to enable ready separation of the slices and to assume a natural unfrozen appearance, such as may best meet the favor of some customers. But generally it is considered best to keep the meat frozen continuously up to the time of delivery to the customer. If properly prepared and packed, the frozen slices may be readily separated individually from the main bulk of the meat package. By appropriate wrapping the meat may be kept insulated so as to remain frozen sufficiently long for transit to the home, and if then placed as soon as practicable in a domestic refrigerator of modern type it may be kept wholesome for a long time.

The stated method of freezing, slicing and otherwise handling the meat assures against any undesired or unnatural appearance of the meat when thawed. The keeping qualities of the meat after retail sale, even if it be then thawed, are enhanced by reason of its continuous frozen condition until or substantially up to the time of sale.

Some of the specific details herein set forth to illustrate the invention may be altered or omitted without departing from the spirit of the invention which is defined by the following claim.

We claim:

The method of treating meat which comprises sharp-freezing the meat to a temperature of zero degrees Fahrenheit or lower in a rapid draft of frigid atmosphere, thereafter tempering the meat to equalize the temperature throughout, slicing the meat with a knife edge cutter, reassembling the slices and subsequently again reducing the temperature thereof to zero degrees Fahrenheit or lower.

HARRY H. McKEE.
FLOYD SEAVER.

CERTIFICATE OF CORRECTION.

Patent No. 2,137,897. November 22, 1938.

HARRY H. McKEE, ET AL.

It is hereby certified that error appears in the printed specification of the above numbered patent requiring correction as follows: Page 1, second column, line 29, for the word "after" read about; and that the said Letters Patent should be read with this correction therein that the same may conform to the record of the case in the Patent Office.

Signed and sealed this 10th day of January, A. D. 1939.

Henry Van Arsdale (Seal) Acting Commissioner of Patents.

when thawed. The keeping qualities of the meat after retail sale, even if it be then thawed, are enhanced by reason of its continuous frozen condition until or substantially up to the time of sale.

Some of the specific details herein set forth to illustrate the invention may be altered or omitted without departing from the spirit of the invention which is defined by the following claim.

We claim:

The method of treating meat which comprises sharp-freezing the meat to a temperature of zero degrees Fahrenheit or lower in a rapid draft of frigid atmosphere, thereafter tempering the meat to equalize the temperature throughout, slicing the meat with a knife edge cutter, re-assembling the slices and subsequently again reducing the temperature thereof to zero degrees Fahrenheit or lower.

HARRY H. McKEE.
FLOYD SEAVER.

CERTIFICATE OF CORRECTION.

Patent No. 2,137,897. November 22, 1938.

HARRY H. McKEE, ET AL.

It is hereby certified that error appears in the printed specification of the above numbered patent requiring correction as follows: Page 1, second column, line 29, for the word "after" read about; and that the said Letters Patent should be read with this correction therein that the same may conform to the record of the case in the Patent Office.

Signed and sealed this 10th day of January, A. D. 1939.

Henry Van Arsdale (Seal) Acting Commissioner of Patents.